United States Patent [19]
Maxwell et al.

[11] Patent Number: 5,508,909
[45] Date of Patent: Apr. 16, 1996

[54] METHOD AND SYSTEMS FOR USE WITH AN INDUSTRIAL CONTROLLER

[75] Inventors: Kenneth G. Maxwell, Smith's Creek; Michael S. McGrath, Royal Oak; Jeffrey A. Millinton, Rochester Hills, all of Mich.

[73] Assignee: Patriot Sensors and Controls, Clawson, Mich.

[21] Appl. No.: 233,686

[22] Filed: Apr. 26, 1994

[51] Int. Cl.$^6$ .................... G06F 19/00; G06F 9/00
[52] U.S. Cl. ...................... 364/147; 364/DIG. 2; 364/926.9; 364/949
[58] Field of Search .................... 364/147, 146, 364/140, 141, 188, 189, DIG. 2 MS File, 191, 192, 193; 395/144, 155, 161

[56] References Cited

U.S. PATENT DOCUMENTS

| | | | |
|---|---|---|---|
| 4,244,034 | 1/1981 | Cherba | 364/900 |
| 4,302,820 | 11/1981 | Struger | 364/900 |
| 4,316,260 | 2/1982 | Hideshima | 364/900 |
| 4,449,180 | 5/1984 | Ohshima et al. | 364/147 |
| 4,831,580 | 5/1989 | Yamada | 364/900 |
| 4,937,777 | 6/1990 | Flood et al. | 364/900 |
| 4,991,076 | 2/1991 | Zifferer et al. | 364/147 |
| 5,058,052 | 10/1991 | Sexton et al. | 364/900 |
| 5,068,778 | 11/1991 | Kosem et al. | 364/138 |
| 5,097,405 | 3/1992 | Sato | 364/140 |
| 5,126,956 | 6/1992 | Komiya et al. | 364/474.22 |
| 5,142,469 | 8/1992 | Weisenborn | 364/146 |
| 5,168,441 | 12/1992 | Onarheim et al. | 364/146 |
| 5,177,420 | 1/1993 | Wada et al. | 318/568.11 |
| 5,285,376 | 2/1994 | Struger et al. | 364/147 |
| 5,287,548 | 2/1994 | Flood et al. | 364/147 |
| 5,299,114 | 3/1994 | Onishi et al. | 364/147 |
| 5,331,540 | 7/1994 | Tanaka et al. | 364/147 |

OTHER PUBLICATIONS

John Kodis; Fletcher's Checksum, Error Correction at a Fraction of the Cost; May, 1992; pp. 32, 34, 36, 38; Dr. Dobb's Journal.

*Primary Examiner*—Joseph Ruggiero
*Attorney, Agent, or Firm*—Brooks & Kushman

[57] ABSTRACT

A method and system for generating a control program executable by an industrial controller, wherein a source program is displayed using a variable width ladder diagram. Instructions of a source program are received by a host computer, wherein the source program is compilable into the control program. A ladder diagram representative of at least one of the instructions of the source program is displayed on a display device. The ladder diagram comprises a graphical interconnection of schematic elements, at least one of which having a corresponding display width which is variable. The corresponding display width is varied in dependence upon the greater of a corresponding symbol display width and a corresponding label display width. A method and system for data communication with the industrial controller uses a hybrid error detection code. Each transmitted packet of data is augmented with either a Fletcher checksum code if the length of the packet is less than a predetermined packet length threshold, or a CCITT-16 cyclic redundancy check code if the length of the packet is greater than or equal to the predetermined packet length threshold.

36 Claims, 20 Drawing Sheets

| sServerName[] | | | |
|---|---|---|---|
| wOpcode | | wServerStatus | |
| | bArbitrate | bIntToServer | bVectToServ |
| wErrorCode | | wServerID | |
| wParam1 | | wParam2 | |
| wParam3 | | wParam4 | |
| wParam5 | | wParam6 | |
| sErrorMessage[] | | | |
| | | wBrdVarSize | |
| Board-Dependent Broadcast Variables | | | |

METHOD AND SYSTEMS FOR USE WITH AN INDUSTRIAL CONTROLLER

TECHNICAL FIELD

The present invention relates generally to methods and systems used with an industrial controller, and more particularly, to methods and systems for displaying a source program in a high-level language, and methods and systems for data communication with an industrial controller.

BACKGROUND ART

Industrial controllers have been used for many years in industrial control applications. The advent of the industrial controller allowed the replacement of electromechanical relay panels, used for on-off sequencing of industrial devices, by solid-state power modules. Today, the industrial controller has evolved to include capabilities to perform data acquisition and storage, to execute complex mathematical algorithms, and to perform system troubleshooting, to name a few.

The industrial controller is programmed by storing instructions into an internal memory circuit. Some controllers are programmed by entering the instructions using a keyboard on a control panel. Many modern controllers are programmed using a host computer equipped with a suitable software package. Using the suitable software, high-level instructions of a source program are entered into the host computer and compiled to form a control program. The control program is transferred to the controller either by a communication link between the controller and the computer, or by storing the control program in a non-volatile memory for physical transfer to the controller.

Some current systems use the host computer for accepting instructions in a high-level language for compilation into the control program for transfer to the controller. Other systems accept instructions in a ladder-based language for compilation into the control program. Further, some systems convert instructions in the ladder-based language to corresponding instructions in the high-level language so that the high-level language instructions can be compiled to form the control program.

Regardless of the specific language employed in creating the source program, it is desirable for an editor operating within the host computer to be capable of displaying a ladder diagram representative of a portion of the source program. In prior methods of displaying a ladder diagram, the width of each element of the ladder diagram is fixed by software running in the host computer. This width is usually measured in terms of a maximum number of characters allowed for describing an element of the ladder diagram. In practice, however, very few elements of a ladder diagram are described using the maximum number of characters. Therefore, rungs of a ladder diagram containing many elements cannot be fully displayed during the editing process. Also, limiting the number of characters used in describing an element to a maximum value does not allow for a long description which may be occasionally desired by a programmer.

Once programmed, the industrial controller repeatedly scans, or polls input devices coupled thereto for logically determining control actions for an output device. The scanning, or polling, is repeated frequently in order to detect changes in the state of the input devices. The step of scanning is performed by examining the status of all of the devices, followed by storing each status in a corresponding memory location. One measure of the performance of an industrial controller is the time required to perform the step of scanning.

Many industrial controllers currently include communication interfaces to allow communication with other controllers, the host computer, and other general peripherals. For example, a network of many controllers can be interfaced for the purpose of distributed processing. Regardless of the design of the network and the interfaces, an error in the transmission of digital data is inevitable. Potential causes of digital data transmission error include attenuation distortion, delay distortion, and noise. In practice, it is common to append each transmission of digital data with a number of redundant check bits for the purpose of error detection. The originator of the message computes these bits as a function of the preceding bits in the transmission. Upon receiving the appended transmission, a recipient performs the same computation and accepts the transmission as being error-free only if the received check bits are the same as those computed.

A widely used technique for error detection employs a cyclic redundancy check. In a cyclic redundancy check algorithm, the bits of a transmission are treated as successive coefficients of a polynomial over the binary field, and the check bits are chosen so that this polynomial is exactly divisible by a preselected polynomial that is a parameter of the algorithm. The cyclic redundancy check technique of error detection has several proven, desirable properties with regard to the types and number of errors which are detectable. However, cyclic redundancy check bits are not efficiently computed in software because of their orientation to polynomials over the binary field.

A class of error detection codes which are efficiently computable by software is an arithmetic redundancy check. In an arithmetic redundancy check algorithm, the check bits are formed using integer arithmetic operations on the bits of a transmission. Unfortunately, the error detecting properties of the arithmetic redundancy check are not quite as good as those of a cyclic redundancy check. However, a specific arithmetic redundancy check whose computation time rivals that of the cyclic redundancy check is known as a Fletcher checksum. A full discussion of the details and properties of the Fletcher checksum is given in "An Arithmetic Checksum For Serial Transmissions", IEEE TRANSACTIONS ON COMMUNICATIONS, Vol. COM-30, No. 1, pp. 247–251, January 1982.

SUMMARY OF THE INVENTION

It is thus an object of the present invention to provide a space efficient display of a ladder diagram, representative of a portion of the source program.

Another object of the present invention is to improve the throughput of data communicated with a controller without significantly sacrificing error detection performance.

A further object of the present invention is to reduce the time required to determine the status of devices coupled to a controller.

A still further object of the present invention is to provide a dynamically changing check code algorithm wherein the effective communication throughout is increased while allowing similar error-free communication.

Another object of the present invention is to provide an improved interface for interprocessor communications.

In carrying out the above objects, the present invention provides a method of displaying one or more instructions of a source program utilizing a computer system having a display device wherein the source program is compilable into a control program executable by a controller capable of controlling the operation of one or more devices. One or more instructions of a source program is received. A ladder diagram representative of at least one of the one or more instructions is displayed on the display device. The ladder diagram comprises a graphical interconnection of one or more schematic elements, wherein at least one of the one or more schematic elements has a corresponding display width which is variable.

Further in carrying out the above objects, the present invention provides a method of data communication between a first controller, capable of controlling the operation of one or more devices, and a peripheral of the controller. A packet of data augmented with an error-detection code is transmitted, wherein the error-detection code is a first check code if the length of the packet is less than a predetermined packet length threshold, and wherein the error-detection code is a second check code if the length of the packet is greater than or equal to the predetermined packet length threshold.

Yet still further in carrying out the above objects, systems are provided for performing the steps of the aforementioned methods.

These and other features, aspects, and embodiments of the present invention will become better understood with regard to the following description, appended claims, and accompanying drawings.

BRIEF DESCRIPTION OF THE DRAWINGS

FIG. 19 is a block diagram of the system memory area; and

BEST MODES FOR CARRYING OUT THE INVENTION

Figure 1:
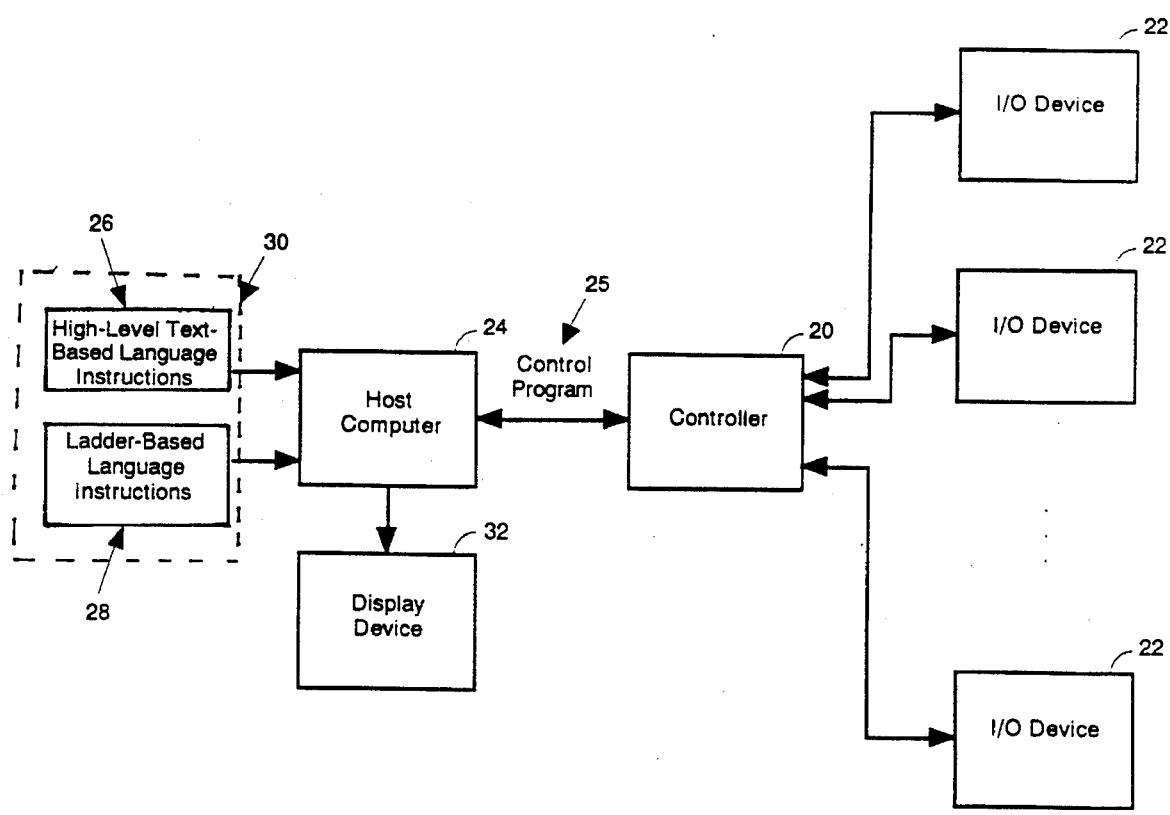
FIG. 1 is a block diagram of an industrial control system.

A system for controlling the operation of one or more input/output devices is shown in the block diagram of FIG. 1. Illustrated is a controller 20 operatively connected to each of the one or more devices 22. The controller 20 can be described generally as an electronic apparatus which uses a programmable memory for an internal storage of instructions for implementing desired functions to control, through digital, analog, or special function input/output modules, various types of machines or processes. The classes of functions which can be implemented include logic, sequencing, timing, counting, and arithmetic functions. The one or more devices 22 can comprise input providing devices such as push buttons, switches, relay contacts, thumb wheels, flow meters, level meters, and thermometers; and output controlling devices such as indicator lights, relay coils, solenoid valves, motor starters, pumps, and stepper motors. Examples of special function input/output modules include serial communication boards, motion control systems, vision systems, and personal computers.

A host computer 24 is operatively connected to the controller 20 for providing a control program 25 comprising the instructions for implementing the desired functions. The host computer 24 generates the control program based upon instructions received in a high-level text-based language 26 and instructions received in a ladder-based language 28. The high-level text-based language instructions 26 and/or the ladder-based language instructions 28 form a source program 30 which comprises high-level instructions for implementing the desired functions to control the one or more devices 22. The operative connection between the host computer 24 and the controller 20 is only necessary to transfer the control program 25.

A programming language is characterized as being a high-level language if higher-order features are included therein. Examples of higher-order features include procedure and function declarations, nested expressions, user-defined data types, and parameter passing, which are not normally found in lower-level languages. Further, high-level languages do not reflect the structure of any one type of computer, which allows machine-independent source programs to be written. Some currently-popular high-level text-based languages include C, PASCAL, FORTRAN, ADA, and LISP.

In contrast, a ladder-based language is one designed for compatibility with the types of control devices that have been replaced by programmable controllers. Specifically, the ladder-based language allows elements such as normally-open and normally-closed contacts, and relay coils, to be arranged in horizontal rows, called rungs. The programmable controller typically solves the logic of a resulting ladder diagram by scanning the ladder diagram rung-by-rung.

The host computer 24 is coupled to a display device 32 to provide one or more displays representative of the high-level text-based instructions 26 and the ladder-based language instructions 28 received by the host computer. The display device 32 is employed to aid in the development of the source program which is to be compiled to form the control program.

Figure 2:
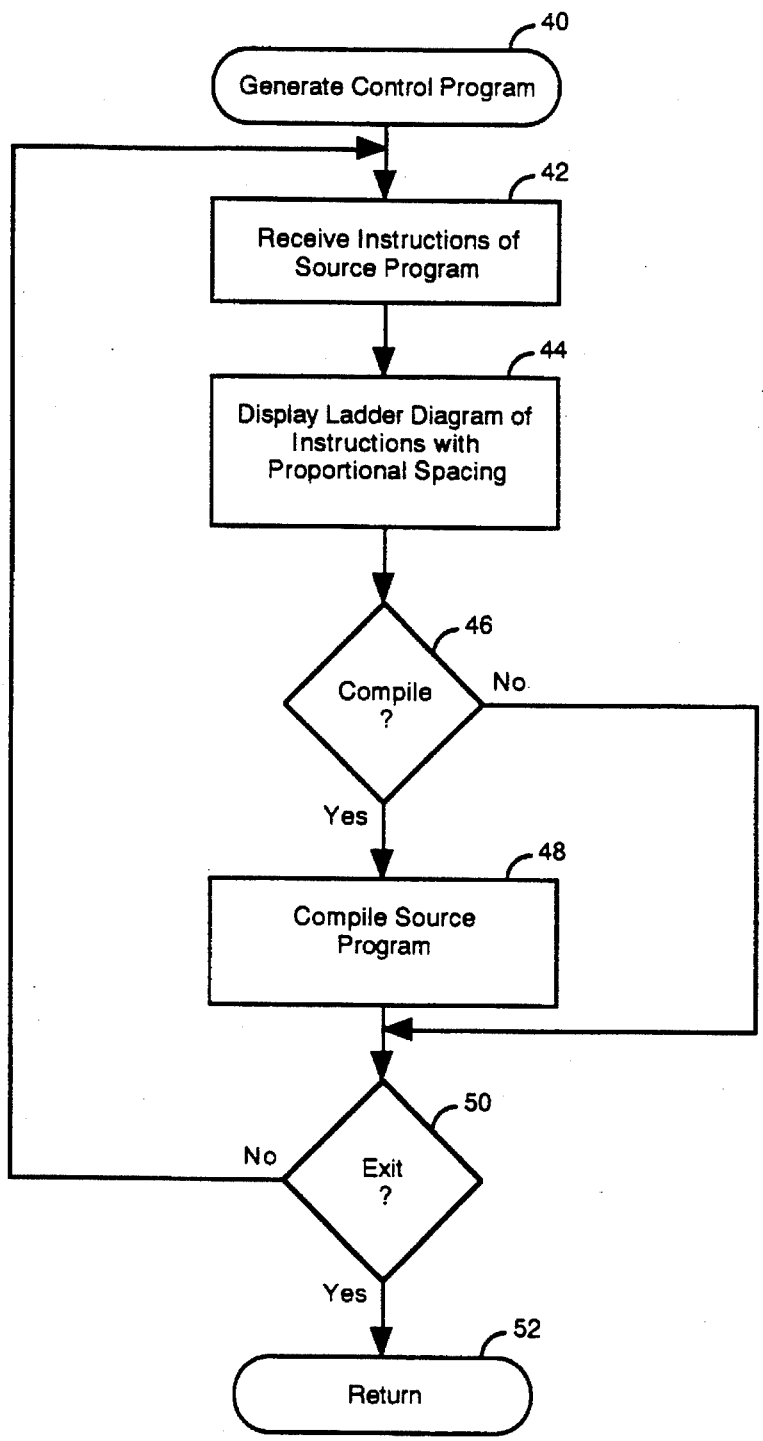
FIG. 2 is a flow chart of a method for generating the control program.

FIG. 2 shows a flow chart for a method of generating the control program 25 executable by the controller 20. Upon an initiation to generate the control program 25 in block 40, one or more instructions of a source program is received by the host computer 24 in block 42. The one or more instructions of the source program is received by standard means of input for computers, such as a keyboard, a floppy disk, a hard disk, ethernet interface, mouse, voice interface, other serial and parallel devices, or any combination thereof. Further, the instructions of the source program can be in either the high-level language or the ladder-based language. In block 44, a ladder diagram representative of at least one of the one or more instructions of the source program is displayed on the display device 32. The ladder diagram comprises a graphical interconnection of one or more schematic elements, wherein each of the one or more schematic elements has a corresponding display width which is variable. The variable width nature of each of the schematic elements produces a ladder diagram that is proportionally spaced. The use of this variable width design results in a much more efficient use of horizontal space on the display device 32.

After receiving the instructions, and proportionally displaying the resulting ladder diagram, conditional block 46 gives an option to compile the source program to form the control program. If compilation is desired, then the source program is compiled into the control program by block 48. After compiling the source program in block 48, or if no compilation is desired in block 46, conditional block 50 is executed to allow further instructions of the source program to be received or to exit the subroutine. If receiving further instructions is desired, then execution of the subroutine is transferred back up block 42. If no further instructions are to be received, then the subroutine is exited by return block 52.

The use of the word "subroutine" in the foregoing description and further descriptions of embodiments of the present invention is merely for representation of a group of steps to be performed, and should not be construed as limiting the steps to be performed within a literal subroutine of a computer program.

Figure 3:
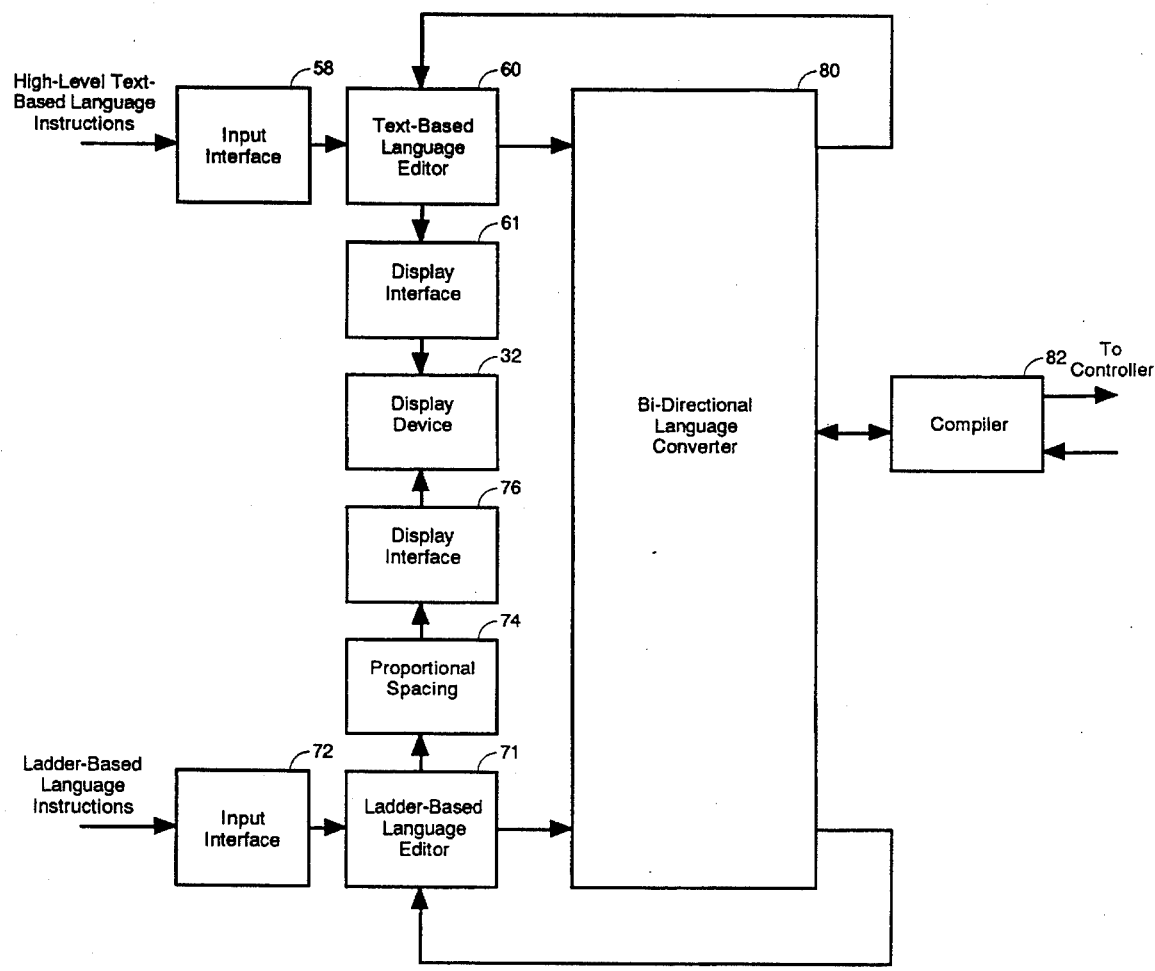
FIG. 3 is a block diagram of a system embodiment for generating the control program.

Turning now to FIG. 3, an embodiment of a system for receiving and displaying instructions of a source program in the host computer 24 is shown. A first input interface 58 provides means for receiving an input of one or more instructions in the high level text-based language for processing within the host computer 24. The first input interface 58 can be formed of a standard input device, such as a keyboard, a floppy disk drive, a hard disk drive, an ethernet interface, a mouse, a voice interface, other serial or parallel devices, or any combination thereof. A text editor 60 within the host computer 24 is coupled to the first input interface 58 to allow a reception of one or more instructions of the source program in the high-level text-based language. To facilitate the development of the source program with relative ease for the user, the text editor 60 operates in a similar manner as an editor of a word processor. The text editor 60 can include features such as ASCII file importing, automatic text formatting, string searching and replacing, and cut, paste and block move capability. The text editor 60 can further include click, drag, and drop capabilities by including a mouse within the input interface 58. The text editor 60 is coupled by a display interface 61 to the display device 32 to allow a display of at least one line of text of a high-level language representation of the source program. The combination of the display interface 61 and the display device 32 is generally capable of providing either a single medium presentation or a multimedia presentation. The display device 32 can employ a standard mode of display, such as a visual display, along with alternative modes of display. An example combination has the display device 32 comprising a video monitor or the like, capable of displaying both text and graphics, and the display interface 61 comprising a video interface card. A further example combination has the display device 32 comprising a printer or plotting device or the like capable of generating a hard-copy output, and the display interface 61 comprising a printer or plotter interface.

A ladder-based language editor 71 within the host computer 24 is employed to facilitate editing of the source program based on an input of relay ladder logic language instructions received via a second input interface 72. As with the first input interface 58, the second input interface 72 comprises input device such as a keyboard, a floppy disk drive, a hard disk drive, a mouse, or the like. Moreover, if desired, the first input interface 58 can be employed as the second input interface 72.

Block 74 provides means for proportionally spacing a ladder diagram to be displayed on the display device 32 via a second display interface 76. If desired, the first display interface 61 can be employed as the second display interface 76. The display device 32 can be configured to allow the ladder diagram and text from the text editor 60 to be displayed either simultaneously or individually. For a simultaneous display, the ladder diagram and the text would preferably correspond to the same portion of the source program. In practice, the text can be displayed in a first software-driven window while the ladder diagram is displayed in a second software-driven window on the display device 32. Alternatively, the text and the ladder-diagram can be displayed on respective panes of a common window.

Various methods of graphically editing a ladder diagram can be employed by the ladder-based language editor 71. For example, the ladder-based language editor 71 can allow the user to modify the ladder diagram by means of clicking a mouse and dragging icons. A template editing mode can also be employed within the editor 71, wherein the user edits a ladder diagram by clicking the mouse on a schematic element therein. The editor 71 responds in the template editing 10 mode by displaying the selected command represented by the schematic element within a dialog box. The dialog box can comprise check boxes, radio buttons, combination boxes, and edit boxes which represent the applicable command. The user may then modify the command and parameters of the command using the dialog box. After completing the modification, the dialog box is removed from the display device 32 and a modified ladder diagram is displayed.

The text editor 60 and the ladder-based editor 71 are each operatively coupled to a bi-directional language converter 80. The bi-directional language converter 80 operates to convert high-level text-based language instructions from the text editor 60 into a ladder-based language representation for application to the ladder-based language editor 71. Similarly, the bi-directional language converter 80 is capable of converting ladder-based language instructions from the ladder-based editor 71 into a high-level text-based language representation for application to the text editor 60. Hence, modifications of the source program made in the high-level text-based language dynamically update the ladder diagram, and modifications of the source program made in the ladder-based language dynamically update the text displayed on the display device 32. A compiler 82 is coupled to the bi-directional language converter 80 for generating the control program based on the source program. The resulting control program can be uploaded from the host computer 24 to the controller 20.

In a preferred embodiment of the present invention, a C-based programming language is selected as the high-level text-based language. The C-based language comprises a subset of the instruction set of a standard C language along with a selected number of additional instructions created to facilitate an ease in translation between the C-based language and the ladder-based language. One possible standard C language from which the C-based language can be formed is ANSI C. The ladder-based language employed in this embodiment is a relay ladder logic language.

Figure 4:
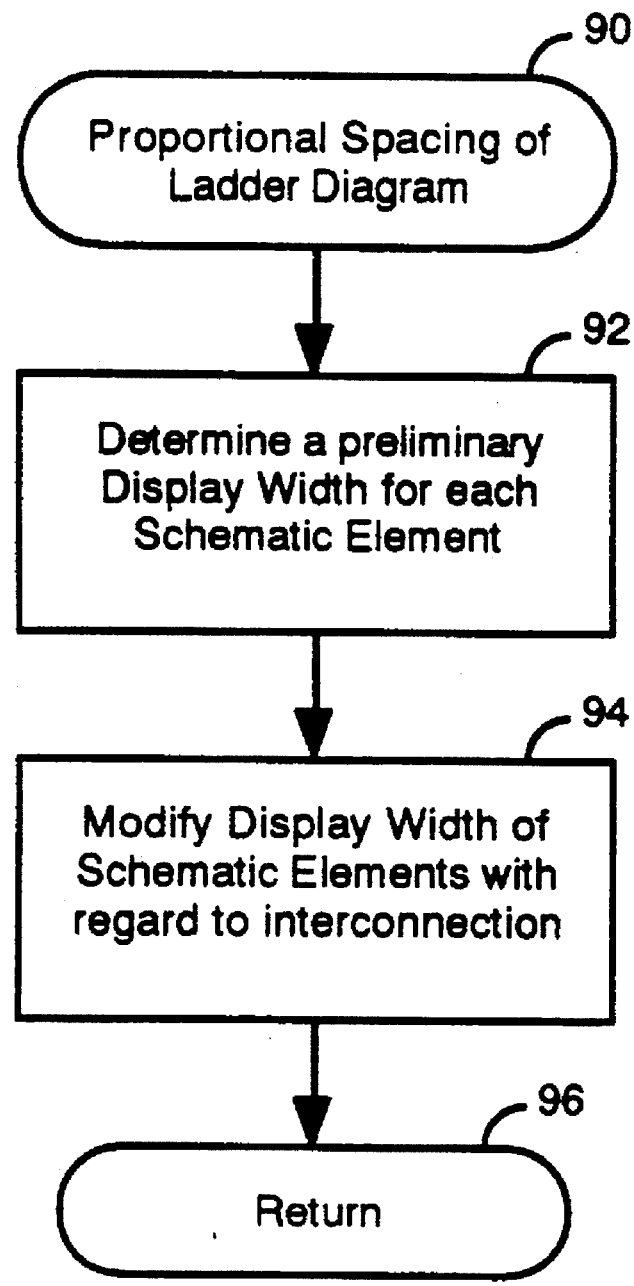
FIG. 4 is a flow chart of a method of proportionally spacing a ladder diagram.

An embodiment of a method of proportionally spacing a ladder diagram, as would be employed within the proportional spacing block 74, is illustrated in FIG. 4. Upon an initiation to generate a proportionally-spaced ladder diagram in block 90, a preliminary display width is determined for each schematic element by block 92. The preliminary display width for each schematic element is formed without regard to the interconnection of schematic elements. In block 94, the display width of each of the schematic elements is modified with regard to the interconnection of schematic elements. Return block 96 signals a termination of the method, and the proportionally spaced ladder diagram is forwarded to the display device 32.

Figure 5:
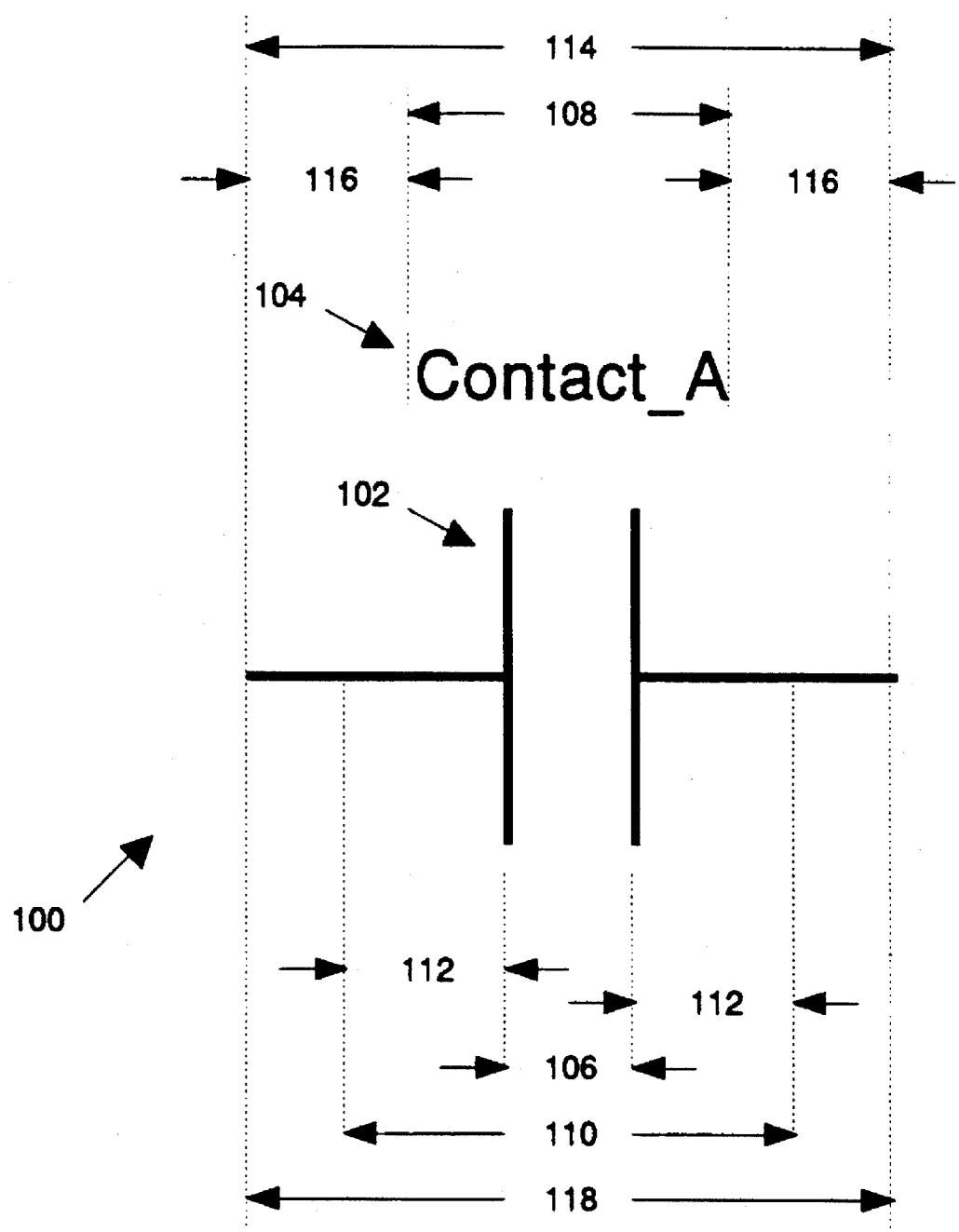
FIG. 5 illustrates an example of a schematic element.

A schematic element representing a relay ladder logic language statement is shown in FIG. 5. The schematic element, designated generally by reference numeral 100, contains a corresponding symbol 102 and a corresponding label 104. The corresponding symbol 102 has a corresponding symbol width 106, and the corresponding label 104 has a corresponding label width 108. A corresponding symbol display width 110 is defined in terms of the corresponding symbol width 106 and a symbol spacing width 112. Similarly, a corresponding label display width 114 is defined in terms of the corresponding label width 108 and a label spacing width 116. An overall display width 118 of the schematic element 100 is defined in terms of the horizontal space needed to display the schematic element 100.

Figure 6:
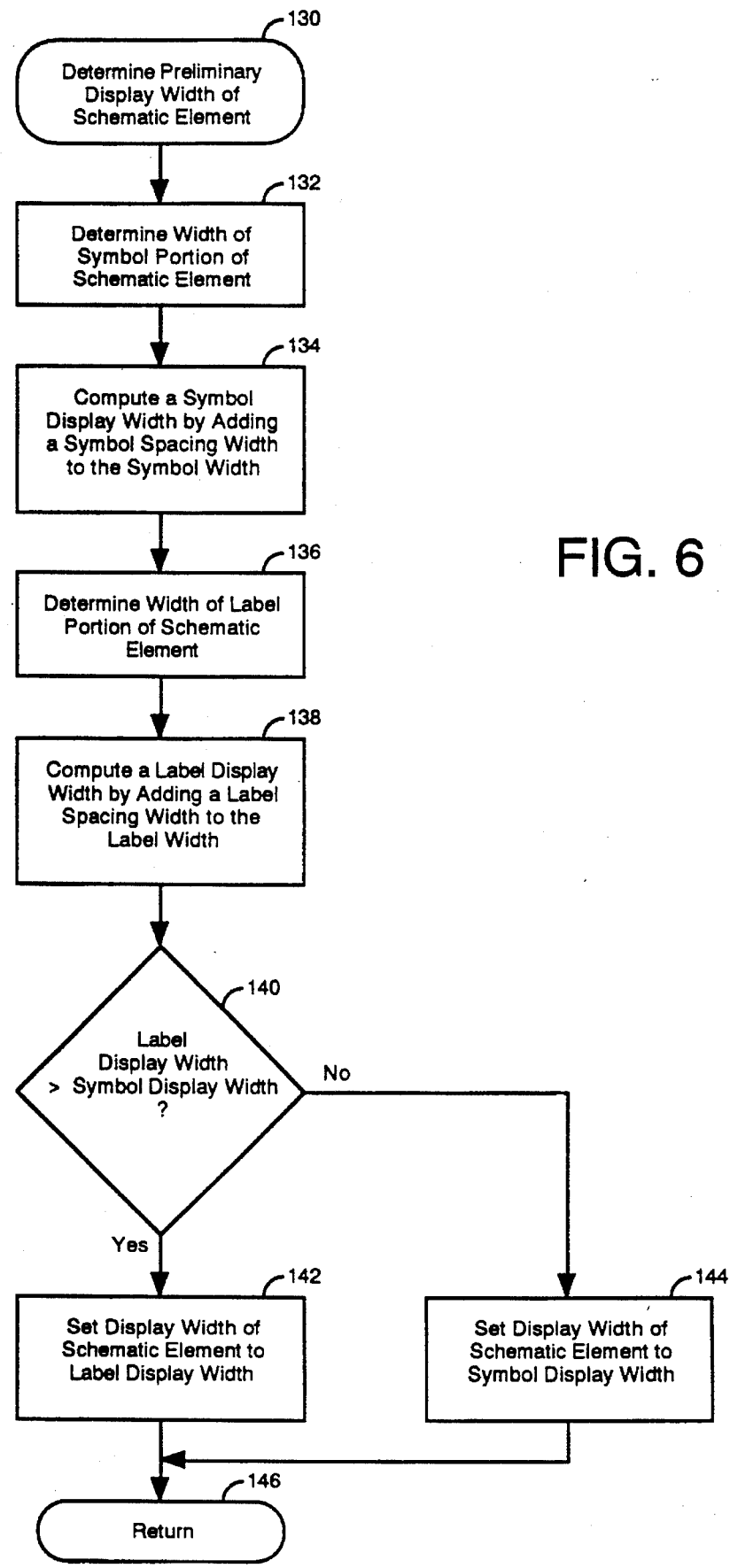
FIG. 6 is a flow chart of a method of determining the display width of a schematic element.

Based on the aforementioned terms defined for a schematic element, a flow chart representation of an embodiment of a method of determining the preliminary display width of a schematic element is illustrated in FIG. 6. After entering the routine in block 130, the symbol width of the schematic element is determined in block 132. The step of determining the symbol width can be performed by retrieving a pre-stored symbol width value for the specific symbol in the element. In block 134, a symbol display width is computed by adding a symbol spacing width to the symbol width. The label width of the schematic element is determined in block 136. The label width is dependent upon the number and types of characters used for describing the symbol. In block 138, a label display width is computed by adding a label spacing width to the label width. Conditional block 140 compares the label display width to the symbol display width. If the label display width is greater than the symbol display width, the display width of the schematic element is set to the label display width in block 142. If the symbol display width is greater than the label display width, the display width of the schematic element is set to the symbol display width in block 144. After setting the display width of the schematic element, either in block 142 or in block 144, the routine is exited by return block 146.

Figure 7:
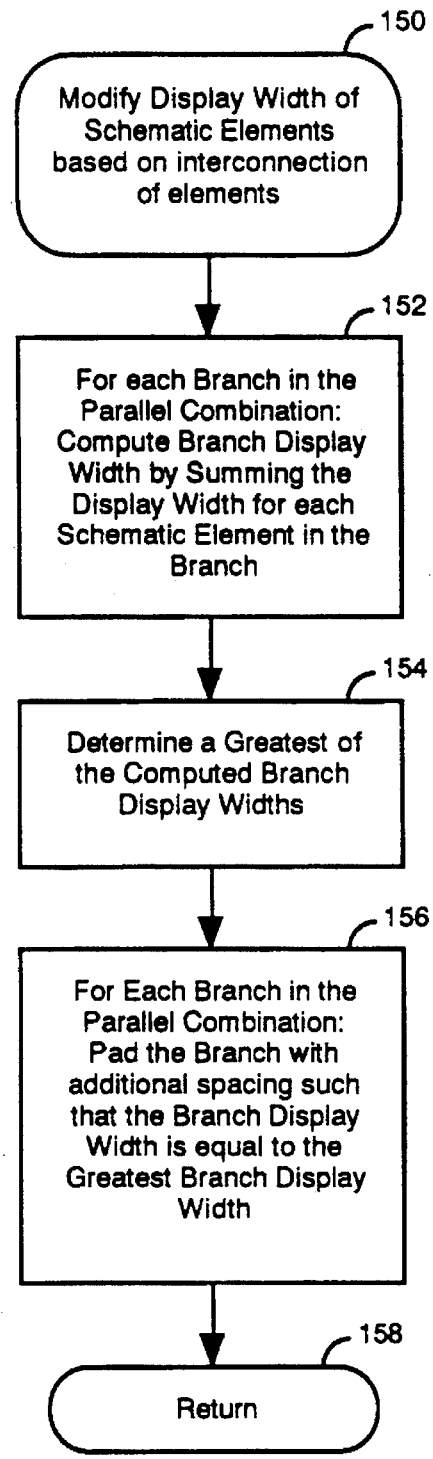
FIG. 7 is a flow chart of a method of modifying the display width of a schematic element.

FIG. 7 shows a flow chart for an embodiment of a method of modifying the display width of a schematic element based on the interconnection of schematic elements. More specifically, the corresponding display width of at least one schematic element within a parallel interconnection is modified so that each of a plurality of branches which define the parallel interconnection have substantially equal corresponding branch display widths. After entering the routine in block 150, a branch display width is computed for each branch in a parallel combination by block 152. The branch display width is computed by summing the preliminary display width for each schematic element in the branch. In block 154, a greatest branch display width is determined based on the computations performed in block 152. In block 156, each branch in the parallel combination is padded with additional spacing so that the resulting branch display width is substantially equal to the greatest branch display width. The routine is then exited by return block 158.

Figure 8A:
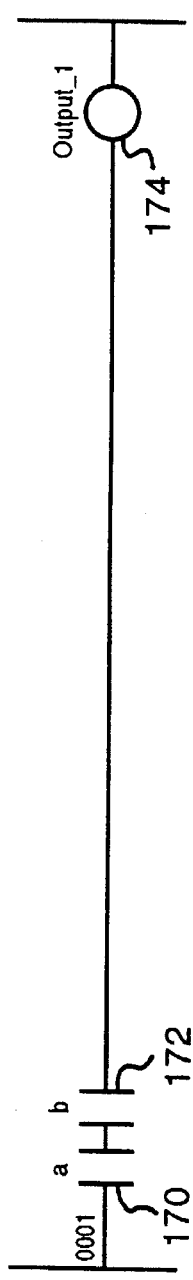
FIGS. 8a–8c show three proportionally-spaced displays.
Figure 8B:
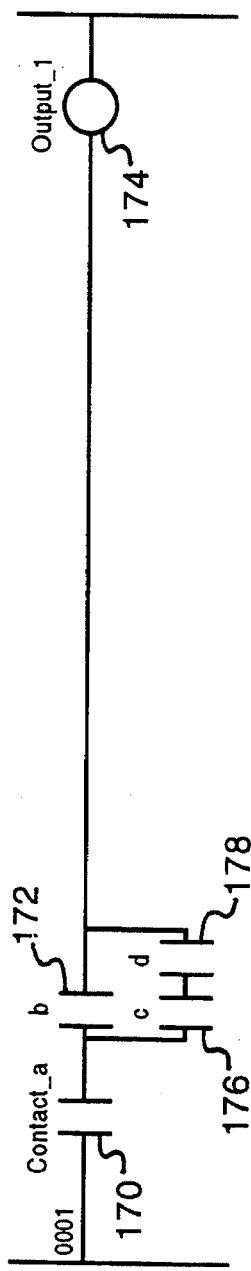
Figure 8C:
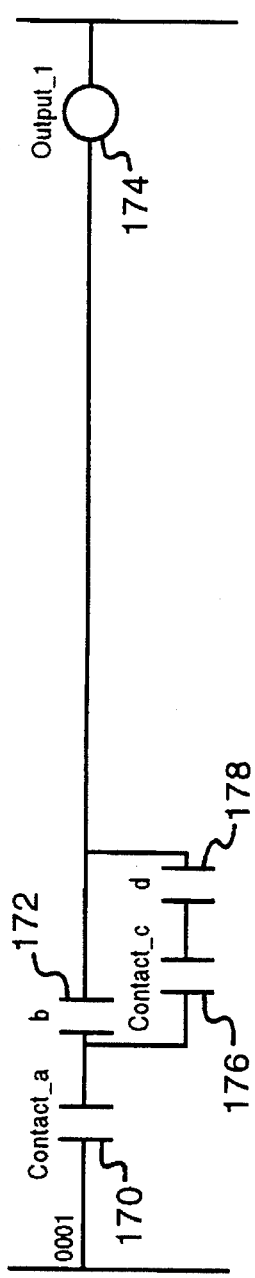

FIGS. 8a–8c show three ladder diagrams which illustrate the proportional spacing methods of the present invention. FIG. 8a shows a rung of a ladder containing two contact switches 170 and 172 in series with a relay coil 174. Contact switch 170 has a corresponding label or "a" and contact switch 172 has a corresponding label of "b". FIG. 8b illustrates a proportionally-spaced ladder diagram which results in response to modifications of the rung in FIG. 8a. The label in contact switch 170 is modified from "a" to "Contact_a". This label modification causes the label display width of contact switch 170 to be greater than the symbol display width, which results in the symbol portions of contact switches 170 and 172 to be spaced further apart. The ladder diagram is further modified by including a combination of contact switches 176 and 178 in parallel to the contact switch 172. In response thereto, the display width of the branch consisting of contact switch 172 is increased to be equal to the display width of the branch consisting of contact switches 176 and 178. In FIG. 8c, the label of contact switch 176 is modified from "c" to "Contact_c". The display width of the branch of the parallel combination containing contact switches 176 and 178 is increased to accommodate the increased label width of contact switch 176.

The use of schematic elements having a variable display width results in an efficient use of the horizontal space available on the display device 32. In traditional systems where the display width of a schematic element is fixed, the fixed display width must be arbitrarily large to accommodate descriptive labels. Since, in practice, a small proportion of the labels take up the maximum space allowed, the use of variable display widths allow more contacts to be viewed simultaneously on the display device 32. By allowing the applications programmer to view a greater portion of each rung of a ladder diagram, source programs can be created more expeditiously, with a reduced likelihood of software bugs.

Figure 9:
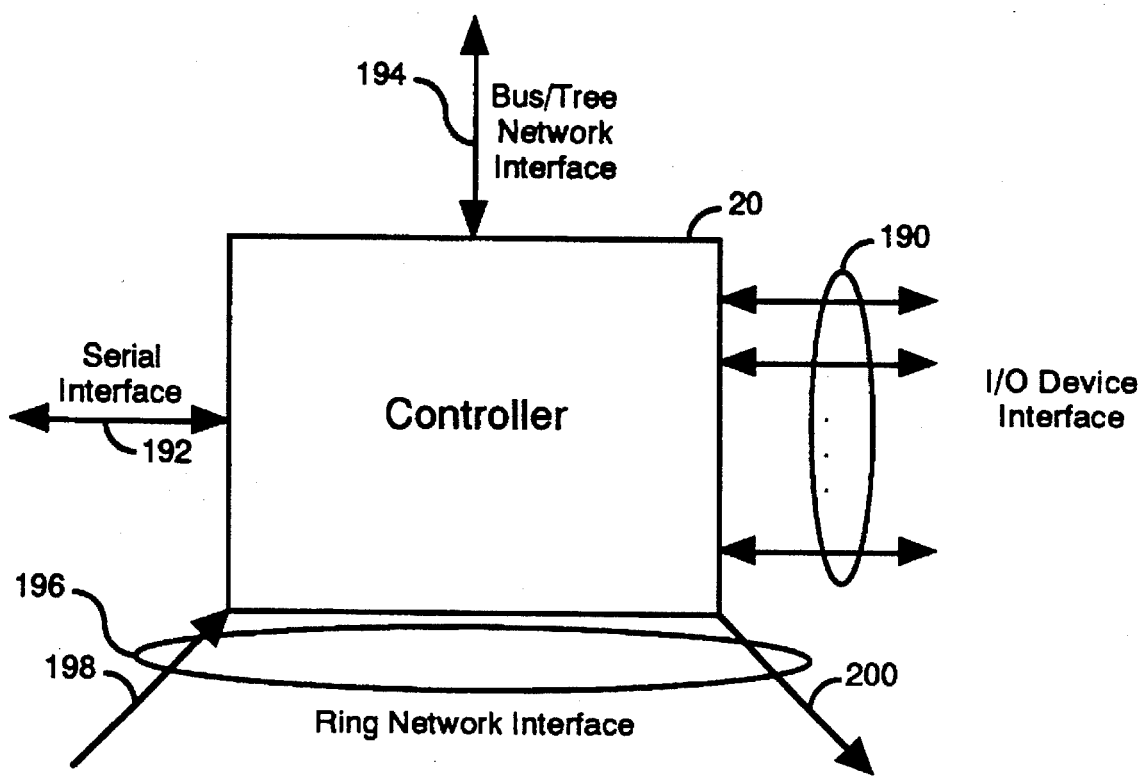
FIG. 9 is a block diagram of an embodiment of a controller of the present invention.

FIG. 9 shows a block diagram representation of an embodiment of the controller 20 of the present invention, illustrating various modes of interfacing therewith. The controller 20 contains one or more device interfaces 190 for operatively connecting each of the one or more devices 22 to the controller 20. In one embodiment of the controller 20, the one or more device interfaces 190 are based on a VME bus architecture. The controller 20 is thus capable of accepting commercially available VME compliant devices, which is beneficial since the VME bus is an open-bus architecture which is widely-used in industrial control applications.

The controller 20 further contains at least one communication interface such as serial interface 192. The serial interface 192 provides an operative connection between the controller 20 and the host computer 24 for data communication therebetween. Communication of data representing the control program is one example of such. The serial interface 192 can employ a common electrical interfacing standard, such as RS-232, RS-422, and RS-485, for communication with a commercially available host computer 24, or can be based on an alternative interfacing standard for communication with a custom host computer 24. In addition to general data transfers between the host computer and controller, the use of the serial interface 192 particularly allows the control program to be either uploaded or downloaded remotely using a modem.

The controller 20 further contains at least one network interface for interfacing with a network of like controllers. A bus/tree network interface 194 is used for interfacing a network of controllers in a bus or tree topology. The bus/tree network interface 194 can employ either broadband or baseband data communication. Baseband embodiments of the bus/tree network interface 194 include use of an Ethernet interface module. A ring network interface 196 is used for interfacing a network of controllers in a ring topology. The ring network interface 196 comprises a receive line 198 and a transmit line 200. The ring network interface 196 is well suited for the use of fiberoptic links for forming the network. The use of fiberoptic links allows a high rate of data transmission, and is further robust to external electromagnetic interference.

Including both the bus/tree network interface 194 and the ring network interface 196 provides a flexible means of interfacing the network of controllers. The ring topology is generally better suited if transmission errors are to be minimized and distances between adjacent controllers are great. The bus or tree topology is better suited for a large number of controllers in the network, and high capacity requirements.

Figure 10:
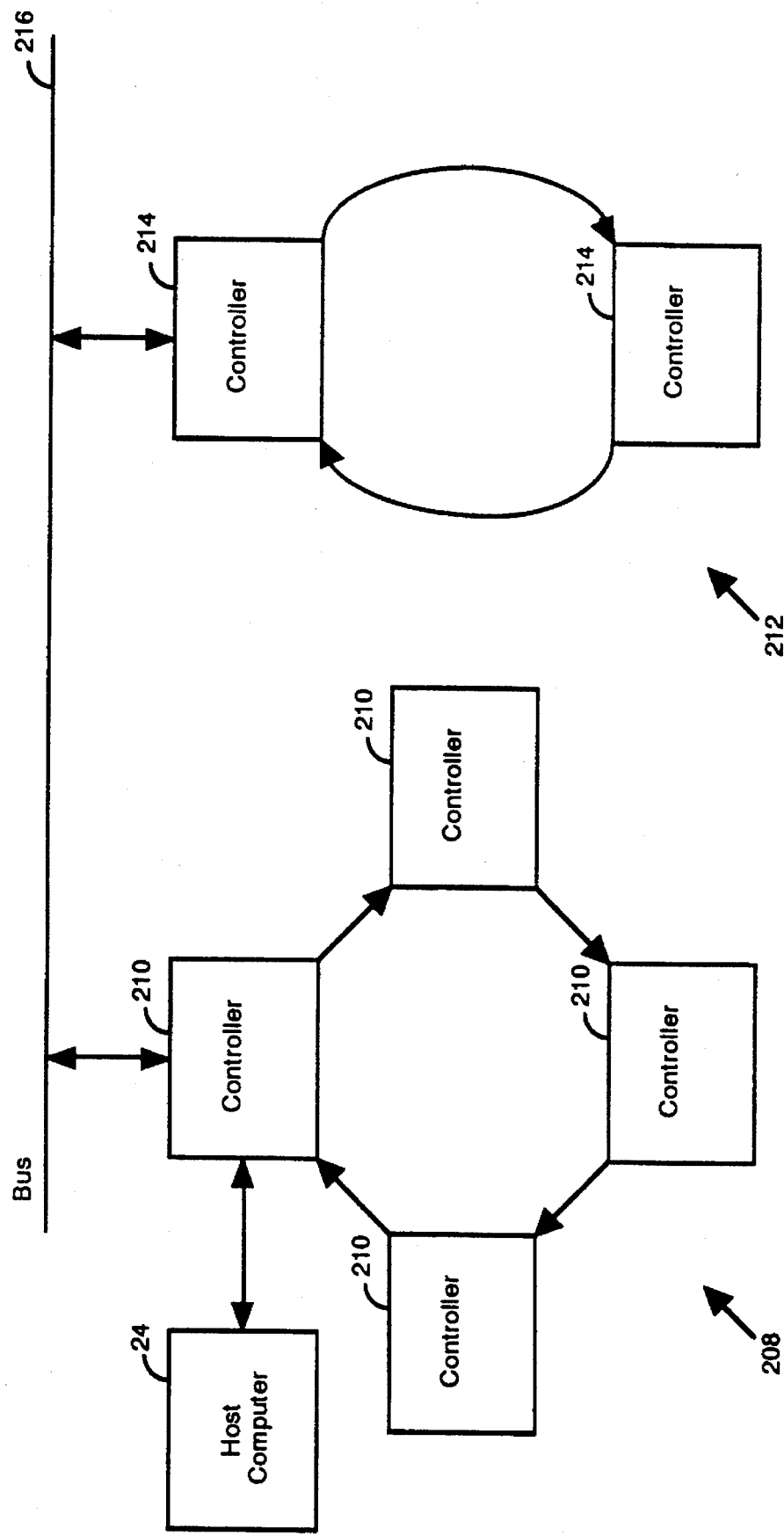
FIG. 10 is an example network of an embodiment of the controller.

FIG. 10 is a block diagram illustrating an example network of controllers interfaced with the bus/tree network interface 194 and the ring network interface 196. A first ring 208 contains four controllers 210 connected by corresponding ring network interfaces to form a closed loop. Specifically, the transmit line of each of the four controllers 210 is connected to the receive line of a corresponding subsequent controller in the first ring 208. A second ring 212 contains two controllers 214 wherein the transmit line of one of the two controllers 214 is connected to the receive line of the other of the two controllers 214, and similarly the receive line of the one of the two controllers 214 is connected to the transmit line of the other of the two controllers 214. The first ring 208 and the second ring 212 are connected using the bus/tree network interface connected to a bus 216. The host computer 24 is connected to one of the four controllers 210 of the first ring 208 by a corresponding serial interface. Although not shown in FIG. 10, each of the controllers in the network are interfaced to one or more devices.

In order to provide an effective and efficient method of data communication using one of the controller interfaces, a hybrid error detection code is employed. The hybrid error detection code is based on a cyclic redundancy check and an arithmetic redundancy check. The arithmetic redundancy check is used when communicating packets of shorter length, which constitutes a majority of the packets communicated with the controller, whereas the cyclic redundancy check is used for packets having a greater length. Since the arithmetic redundancy check can be computed many times faster than the cyclic redundancy check, and since the difference in error detection performance is small for shorter length packets, the resulting hybrid code processes a majority of the packets using less computation time without significantly sacrificing error detectability. In contrast, the packets of greater length, which comprise a minority of the transmitted packets, are communicated using a highly-effective error detection code.

Figure 11:
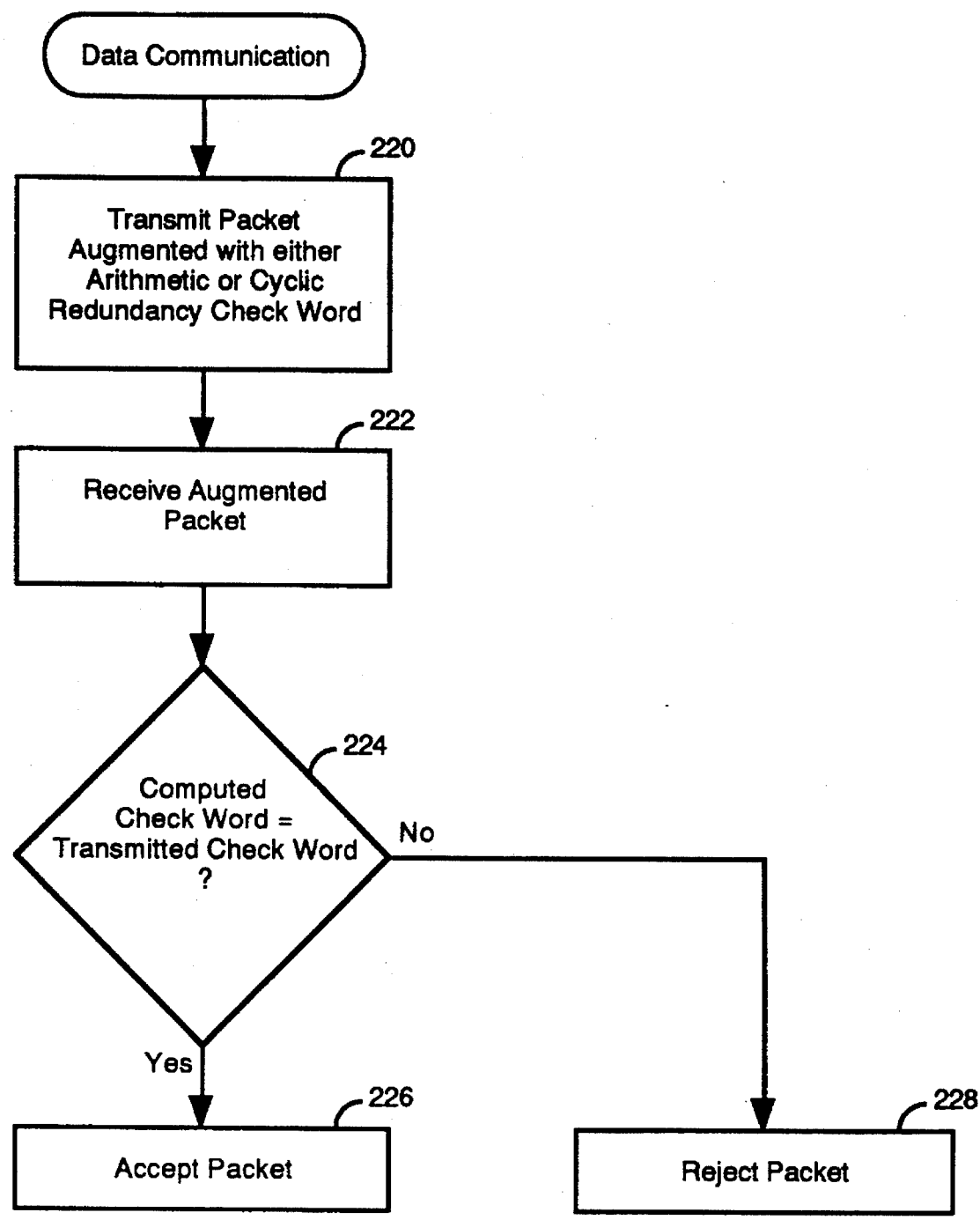
FIG. 11 is a flow chart of an embodiment of a method of data communication with a controller.

An embodiment of a method of data communication between the controller 20 and a peripheral operatively connected by a network interface is shown in FIG. 11. One with ordinary skill in the art will also recognize that this method of data communication could be carried out between the controller 20 and the host computer as well. A packet of data, representing a message or a subset of a message to be communicated, is augmented with an error detection code and transmitted in block 220. The error detection code is either an arithmetic redundancy check code if the length of the packet is less than a predetermined packet length threshold, or a cyclic redundancy check code if the length of the packet is greater than or equal to the predetermined packet length threshold. The packet of data can be transmitted either by the controller or the peripheral. The step of receiving the augmented packet is represented by block 222. The augmented packet can be received either by the controller, the peripheral, or any node device located therebetween. The node that receives the augmented packet computes an error detection code based on the augmented packet, and compares the computed error detection code to the transmitted error detection code in block 224. In block 226, the received packet of data is accepted if the computed error detection code is equal to the transmitted error detection code. The received packet of data is rejected by block 228 if the computed error detection code is not equal to the transmitted error detection code.

Figure 12:
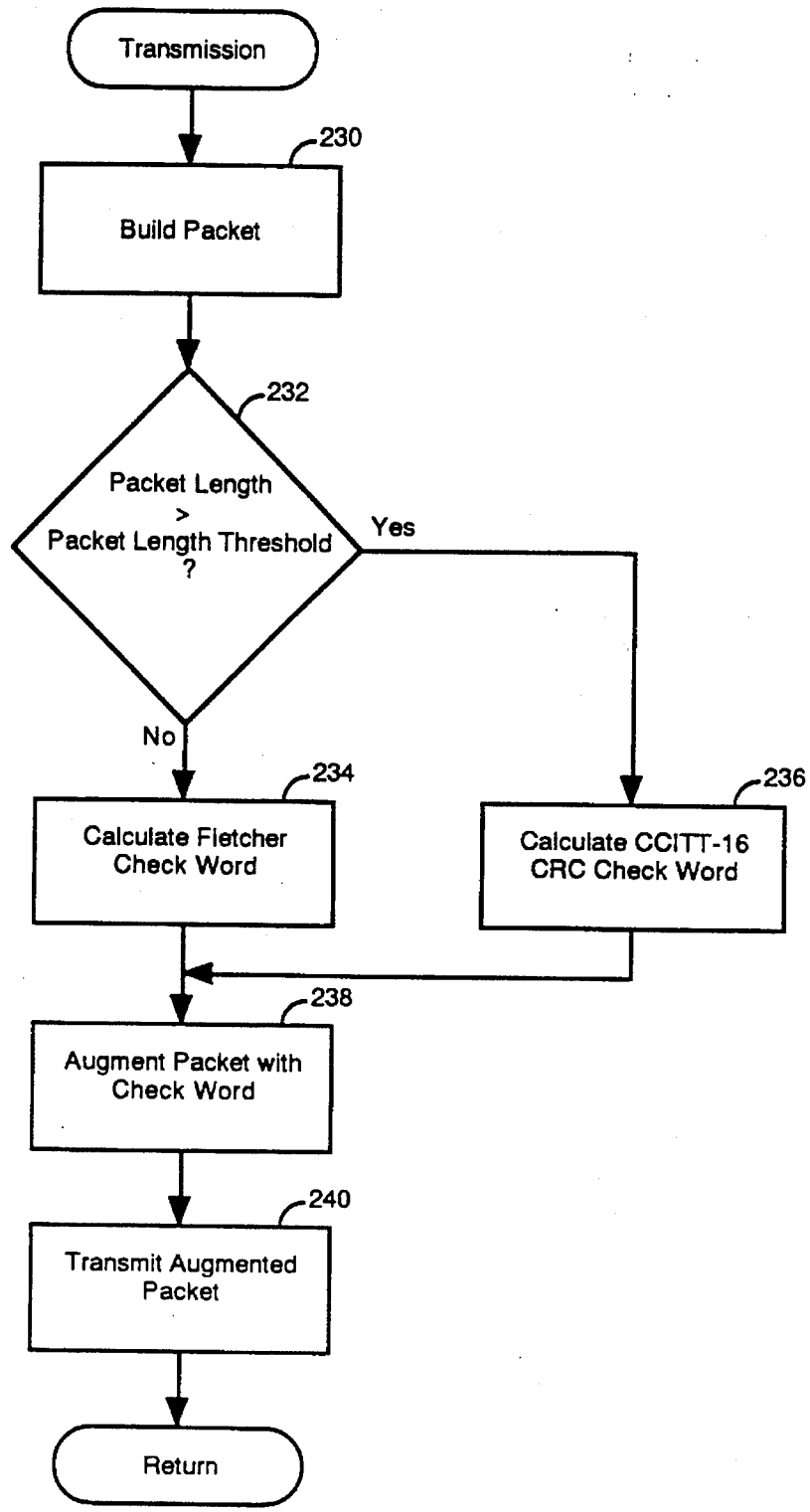
FIG. 12 is a flow chart of an embodiment of a method of data transmission.

An embodiment of a method of transmitting the augmented packet is illustrated by the flow chart in FIG. 12. In block 230, a packet of data is built based on a predefined packet structure. The length of the packet is compared to the predetermined packet length threshold in conditional block 232. If the packet length is less than or equal to the predetermined packet length threshold, then a specific arithmetic redundancy check, namely a Fletcher checksum word, is calculated for the packet in block 234. If the packet length is greater than the predetermined packet length threshold, then a specific cyclic redundancy check, namely a CCITT-16 cyclic redundancy check word, is calculated for the packet in block 236. In block 238, the packet is augmented with the calculated error detection code by appending the check word to the end of the packet. Finally, the augmented packet is transmitted by block 240. An alternate embodiment of the method of the present invention could employ a 32-bit or larger cyclic redundantly check word such as CCITT-32.

Figure 13:
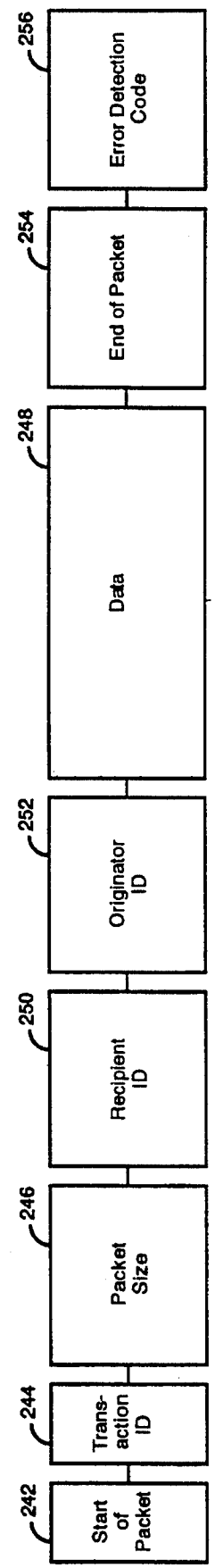
FIG. 13 shows one embodiment of a packet structure for use in embodiments of the present invention.

FIG. 13 illustrates a packet structure for use in embodiments of the present invention. The packet comprises a one-byte start-of-packet indicator 242, used for detecting the start of a packet. A one byte transaction identifier 244 follows. The next two bytes are allocated for transmitting a packet size 246, which is defined as the number of bytes in a data portion 248 of the packet. Following the packet size 246, two bytes are allocated for identifying the recipient of the packet 250. The next two bytes 252 are used for identifying the originator of the packet. The data to be transmitted 248, whose length is not fixed, is next in the packet. The end of packet is indicated by two predetermined bytes which follow the data portion 248. The packet length is defined as the number of bytes in the packet, from the start-of-packet byte 242 up to and including the end-of-packet bytes 254. Two bytes representing the error detection code 256, computed in either block 234 or block 236, are appended after the end-of-packet bytes 254. It should be noted that each of the various fields which constitute the packet are fixed length with the exception of the data field. Therefore, the method of the present invention, in effect, varies the check code based on the length of the data field.

Figure 14:
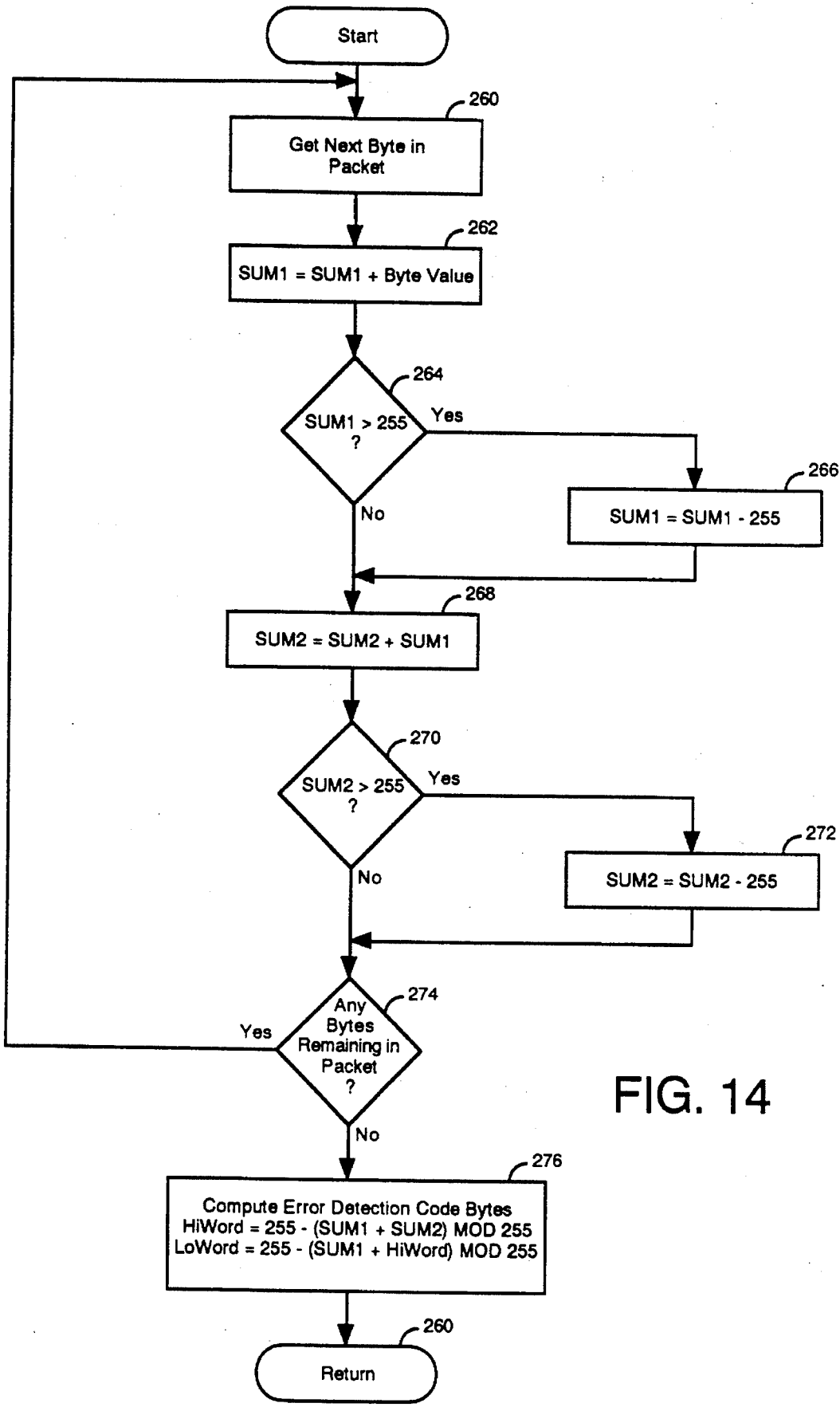
FIG. 14 is a flow chart of a method of computing a Fletcher checksum.

An embodiment of a method of computing the Fletcher checksum for bytes comprising eight bits is illustrated by the flow chart in FIG. 14. Before performing the steps of the method, a first and a second summation value are each initialized to 0. The value of a next byte in the packet, which is simply the value of the first byte in the packet if no previous values were obtained, is obtained in block 260. In block 262, the byte value is added to the first summation value. The first summation value is compared to a value of 255 in conditional block 264. If the first summation value is greater than 255, then the first summation value is reduced by 255 in block 266. Using either an unmodified first summation value if the first summation value is not greater than 255, or a reduced first summation value formed in block 266, block 268 increases the second summation value by the first summation value. In conditional block 270, the second summation value is compared to 255. If the second summation value is greater than 255, then the second summation value is reduced by 255 in block 272. Conditional block 274 determines whether there are any further bytes remaining in the packet. If so, then flow of the routine is directed back to block 260 in which the next byte in the packet is obtained. If no further bytes remain in the packet as determined by block 274, then the two bytes of the error detection code are computed in block 276. Specifically, a high byte of the check word is set to 255 minus the sum of the first summation value and the second summation value modulo 255, and a low byte of the check word is set to 255 minus the sum of the first summation value and the value of the high word byte modulo 255.

Figure 15:
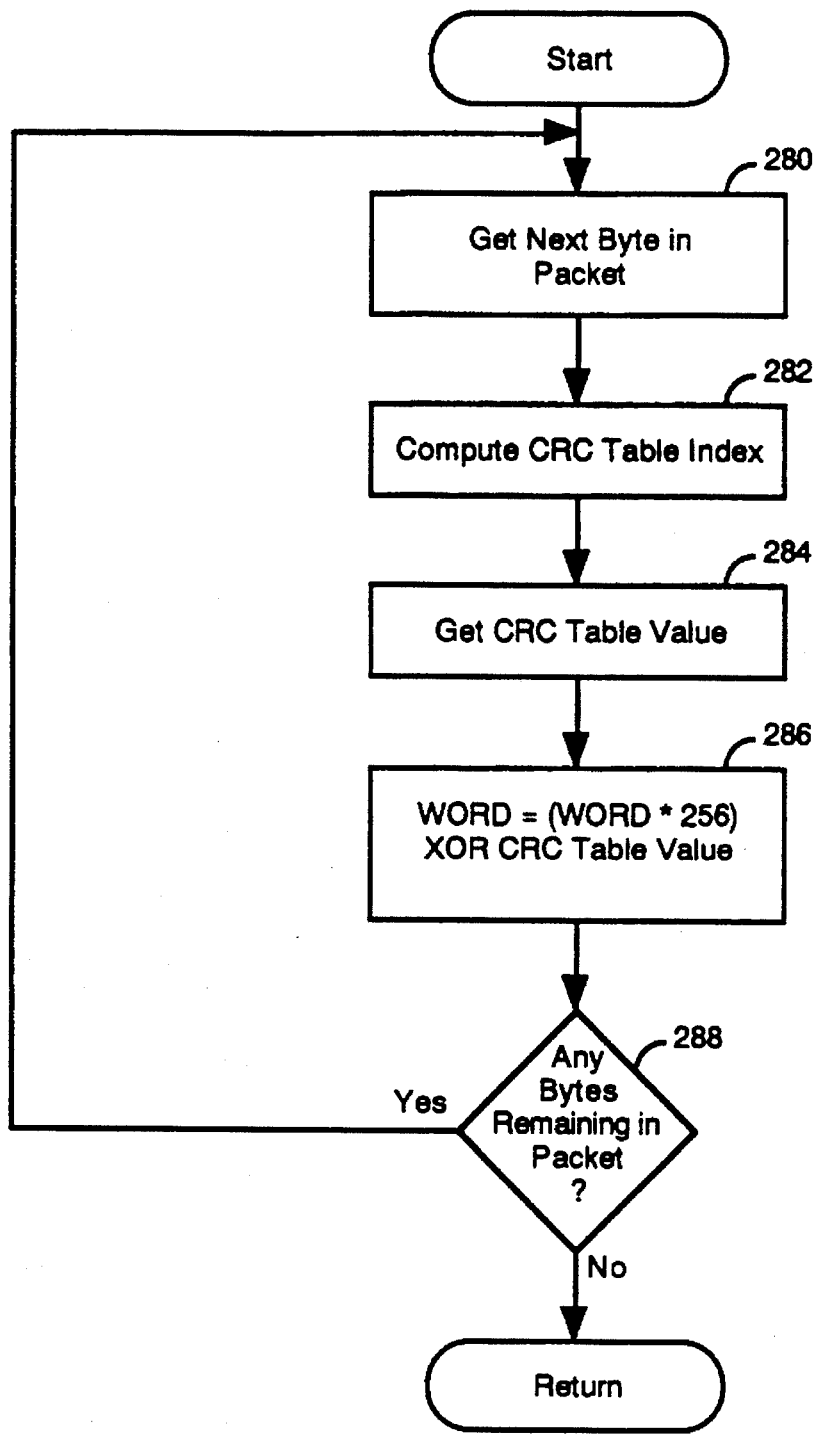
FIG. 15 is a flow chart of a method of calculating a CCITT-16 cyclic redundancy check word.

FIG. 15 is a flow chart illustrating an embodiment of a method of calculating a CCITT-16 cyclic redundancy check word. In block 280, the value of the next byte in the packet is obtained; if no previous values were obtained, the value of the first byte in the packet is obtained. A CRC table index is computed in block 282 based upon the obtained value of the byte. In block 284, the CRC table index is used in conjunction with a pre-computed CRC look-up table in order to determine a CRC table value. The check word is updated in block 286 to be equal to the exclusive or (XOR) of the CRC table value with the product of the previous value of the check word times 256. Conditional block 288 examines whether there are any bytes remaining in the packet. If so, flow of the routine is directed back to block 280 in order for the same operations to be executed on the next byte in the packet. If no further bytes are remaining in the packet as determined by conditional block 288, then the latest value of the check word is returned.

The methods of computing the error detection code illustrated in FIGS. 14 and 15 are employed for both the packet originator and the packet recipient. For the packet recipient, the packet length used for comparison to the packet length threshold is the length of the received packet excluding any bytes used in the error detection code. In one embodiment, the packet length threshold is selected to be the expected median packet size plus one. One with ordinary skill in the art will also recognize that the packet length threshold could be calculated based on the relative error detection effectiveness of each check code used.

One having ordinary skill in the art will recognize that a variety of alternative methods of computing the Fletcher checksum currently exist. A discussion of various methods used for computing the Fletcher checksum can be found in "Fletcher's Checksum", Dr. Dobb's Journal, pp. 32–38, May 1992. Similarly, the method of calculating a CCITT-16 cyclic redundancy check word illustrated in FIG. 15 is one of a variety of methods for calculating the same check word.

Figure 16:
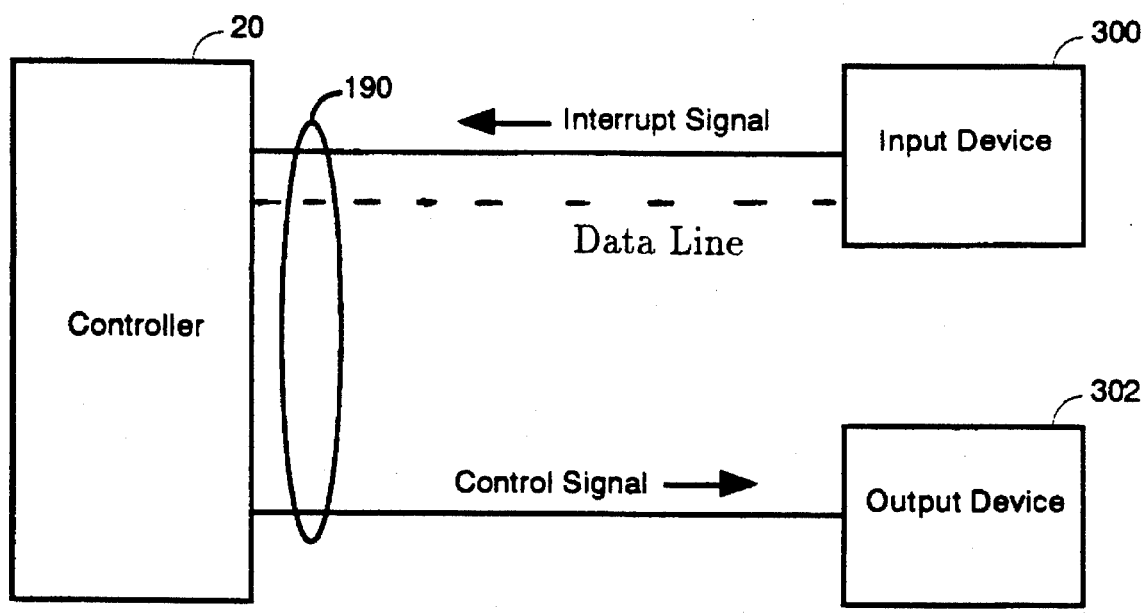
FIG. 16 is a block diagram of an industrial control system employing interrupt-driven communication.

In order to reduce the time required to determine the status of devices coupled to the controller, an interrupt-driven method of communication is employed in embodiments of the present invention. A block diagram of an industrial control system which employs the interrupt-driven method of communication is shown in FIG. 16. An input device 300, capable of providing an interrupt signal, is coupled to the device interface 190 of the controller 20. An output device 302, capable of performing an action in response to a control signal, is also coupled to the device interface 190. The controller 20 is capable of executing a control program which is responsive to interrupt signals received at the device interface 190. Within the interrupt signal, a data signal and an identification signal are contained. The identification signal allows the controller to distinguish between different types of interrupts which are defined. In a preferred embodiment, wherein a VME bus is employed in the device interface 190, the identification signal represents an integer value from 1 to 7 corresponding to the 7 valid interrupts defined for the VME bus. The data signal contains a vector of bits used for transmitting data from the input device 300 to the controller 20.

In comparison to previous controllers which repetitively scan the status of the input device 300, embodiments of the present invention are capable of receiving the interrupt signal upon a change in status of the input device 300. This interrupt signal can be used by the controller 20 in a variety of ways. The interrupt signal can initiate the controller 20 to modify execution of the control program in response to the status of the input device 300. Alternatively, the interrupt signal can be used to modify a corresponding memory location representative of the status of the input device. Regardless of the specific implementation of the interrupt signal, the control signal dependent upon the received interrupt signal is computed by the controller and transmitted to the output device 302. The control signal can also be an interrupt signal if the output device 302 is capable of accepting interrupts.

Figure 17:
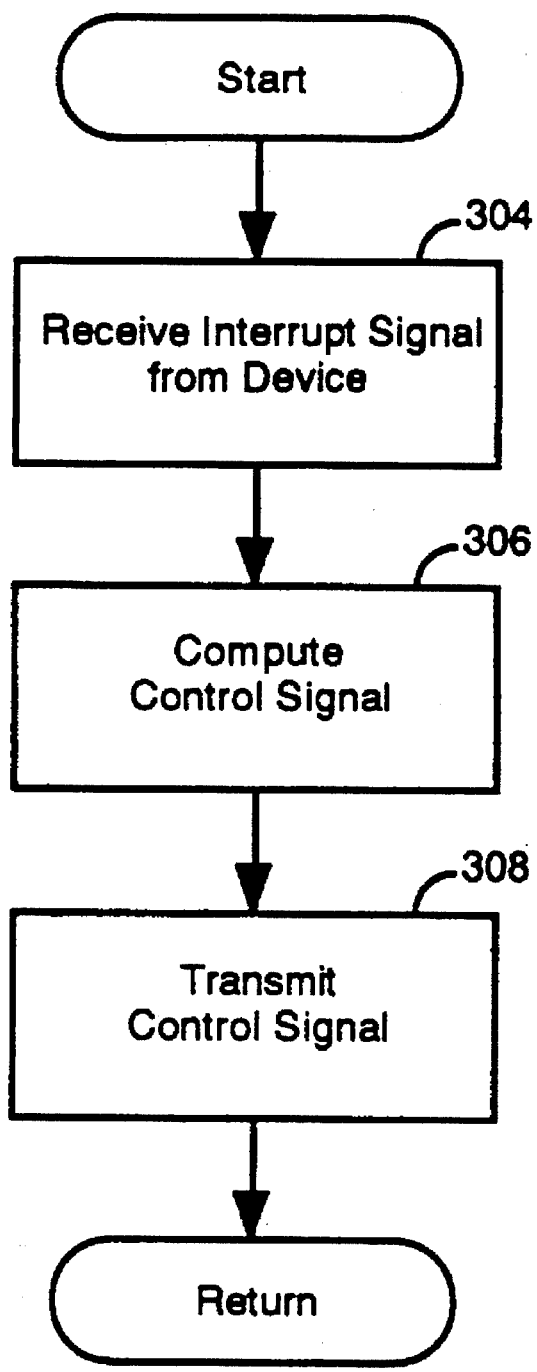
FIG. 17 is a flow chart of a method of controlling an output device.

A flow chart illustrating the interrupt-driven method of device scanning is shown in FIG. 17. Initially, the interrupt signal is received by the controller 20 in block 304 from one or more input devices. The received interrupt signal indicates the status of the one or more input devices. In block 306, the controller computes the control signal dependent upon the received interrupt signal. The control signal is transmitted to the output device 302 by block 308, wherein the output device 302 performs an action in response to the control signal.

The previously described versions of the present invention have many advantages, including the ability to display a greater portion of each rung of a ladder diagram when creating a source program than prior methods and systems. Another advantage of the present invention results from the improved throughput of data communicated using controller interfaces. The improved throughput, without a significant sacrifice in the error detection rate, is highly beneficial for a network of controllers which employ distributed processing. A further advantage results from the capability of interrupt-driven communication between the controller and the devices. Changes in the status of the devices can be immediately transferred to the controller, as opposed to waiting until the next polling of the devices.

Figure 18:
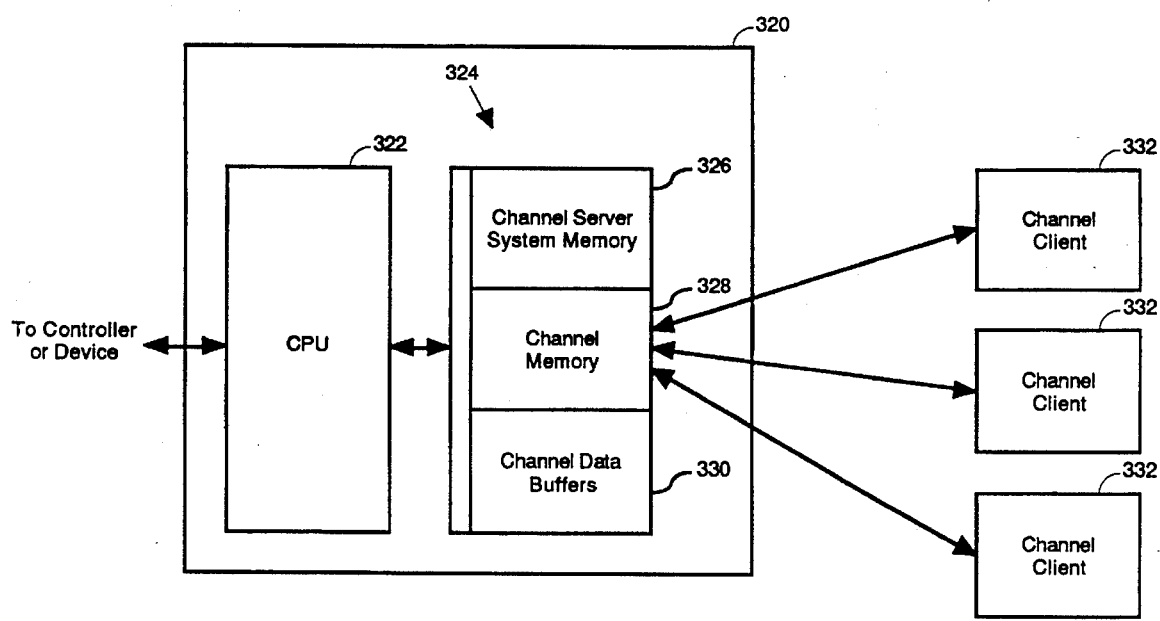
FIG. 18 is a block diagram of an embodiment of an interprocessor communications interface.

Turning now to FIG. 18, an embodiment of an interprocessor communications interface 320 for use with an industrial controller is illustrated. The interface 320 includes a CPU board 322 coupled to a memory 324. The memory 324 is divided into three general sections to serve its purpose as a dual-port memory for the channel server. A first section 326 is used for channel maintenance. A second section 328 is used to hold each of the open channels, and is variably sized depending on the maximum number of channels the specific channel server is intended to support. A third section 330 is used as data buffers for each of the channels. The third section 330 is employed when transferring large blocks of data over the bus.

The software required to implement a channel protocol is referred to as a channel driver. For embodiments of the present invention, the channel protocol is a generic protocol which is not specific to the type of industrial controller used. For this purpose, the channel driver does not examine message fields, or recognize any specific message types. It is the job of the implementer to use pre-defined channel driver interface functions in such a way as to support a desired message and data passing protocol.

The channel driver may be implemented as a channel client, which is an external CPU board that can access channels on other boards but cannot provide communication channels locally, or as a channel server, which can both access external channels and create new channels in the dual port memory on the CPU board on which it resides. In FIG. 18, the interface 320 is a channel server which is coupled to one or more channel clients 332. In a VME bus implementation, the channel server is coupled to the channel clients via a VME bus backplane.

An overview of the functions performed by the three sections of the channel server memory 324 is as follows. The first section 326 of the memory 324, also referred to as a system memory area, is shared by all clients using the server. The first section 326 contains board identification information, an interrupt level and vector used by the server, resources allowing system memory arbitration, fields for creating and deleting private channels, fields for command response information, and board-specific broadcast variables. A block diagram of the information contained in the system memory area is illustrated in FIG. 19.

The second section 328 of the memory 324 is used to create a number of private channels. The channels are assigned to individual clients on a first come, first served basis. The channels contain offset pointers to the third section 330 which can be used for raw data transfers. The channels further contain information about each channel owner, i.e. client, including name, interrupt vector, and interrupt status identification. The channel also holds a message transfer buffer and control information.

The third section 330, also referred to as a RAM pool, is a variably-sized memory pool used for stream mode data transfers. Each open channel contains pointers and buffer sizes for two blocks of RAM which are allocated from this pool. In a preferred embodiment, two 1k byte buffers are assigned to each newly-opened channel. Either of the two data buffers may be resized at run time, although this may lead to fragmentation of the RAM pool. The channel owner is able to resize the buffers using commands passed in the system area.

Each of the three memory sections will now be discussed in more detail. The first section 326 is used for opening new channels, removing channels, and resizing channel data buffers. The structure of the first section 326 includes a board name field which is filled in by the channel server to allow external CPUs to inspect the type of boards in the system. The first section 326 further includes a variably-sized array of board-defined global variables. This array is used to post board-specific information and data variables so that any of the external boards can examine them at any time. Each user can freely define its own size and usage of the first section 326 when creating a channel server implementation.

The first section 326 is the only portion of the memory 324 which is shared by all channel clients. Since it is inevitable that more than one client may simultaneously wish to request a system service, this memory area is arbitrated for by the channel client, and freed by the client when the system service is completed. In a VME bus implementation, a mechanism for arbitrating for a common resource is defined which uses an indivisible test-and-set type of instruction which cannot be interrupted by other VME bus masters. As a result, an arbitrate byte is included in the first section 326 for embodiments of the present invention which employ the VME bus.

The second section 328 is used to provide a private channel memory area for each CPU board which opens a channel on the channel server. This private communications channel can be used for sending and receiving messages, for transferring blocks of data, or for both. Each channel can be operated in either a message passing mode or a stream mode. The stream mode would typically be employed for transfer of raw data. The second section 328 allows any channel to switch back and forth at run time between these two modes by including a stream mode variable.

The channel server requires a specific interrupt and status identification when a message is sent to the channel server. The channel client may receive an interrupt when messages are sent from the server to the client, or may operate in a polled mode if desired. If a channel client does not want to be interrupted by the channel server, the client indicates this by modifying an interrupt-from-server variable in the second section 328. In a preferred embodiment, each channel message is of the type which occupies 16 bytes.

In the third section 330 of the memory 324, two data buffers are created and linked to each open channel. The first data buffer holds data passed from the client to the server, and the second data buffer holds data that is passed from the server to the client. These data buffers can be resized at run time using channel server system commands. In a preferred embodiment, the default data buffer size is 1k byte.

The data buffers are used to transfer various types of data between two CPU boards. The channel driver functions manage the data buffers such that they appear as continuous circular buffers: one for outgoing data and one for incoming data as viewed from the channel server. Each implementor is free to decide what to write or read from the data buffers.

Figure 20:
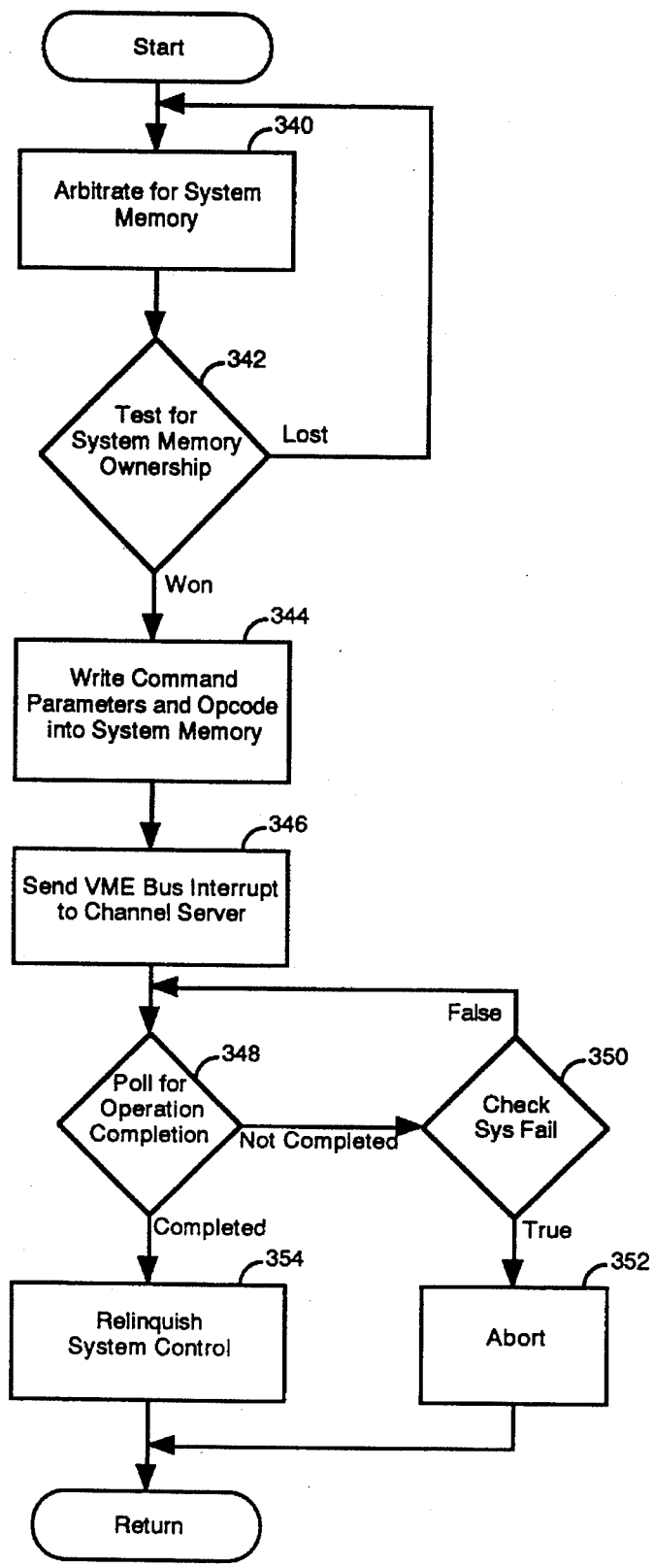
FIG. 20 is a flow chart of a method for gaining control of a server system memory.

A flow chart of a method employed by an external CPU board for gaining control of the server's system memory is illustrated in FIG. 20. In block 340, a step of arbitrating for memory is performed. More specifically, a read-modify-write cycle is performed on the arbitrate byte of the first section 326 of memory. In block 342, a test of the ownership of the first section 326 is performed. If the first section 326 is not yet available to the external CPU board, the flow of the routine is directed back to block 340 to perform the step of arbitrating for system memory. If the first section 326 is available, then the command parameters and command opcode are written into system memory in block 344.

In block 346, a VME bus interrupt is sent to the channel server defined by two bytes in the first section 326 of the memory. These two bytes define the interrupt level to which the server listens, and the wake-up vector for the system server. In blocks 348 and 350, two variables in the first section 326 of the memory, namely a system-fail byte and an opcode word, are polled to determine when operation has completed. In a preferred embodiment, a completed operation is indicated when the opcode word is set to zero by the channel server. If the operation has completed, the arbitrate byte is cleared in block 354 to relinquish control of the first section 326 of the memory.

The above-described embodiments of the interprocessor communications interface and protocol for use with industrial controllers have many advantages. The use of interrupt-driven message passing produces a greatly-reduced bus bandwidth usage since no polling of the communication channels is required. Further, the determination of interrupt levels and status identification used by each board participating in the protocol can be performed at run time. The dynamic allocation, deallocation, and sizing of channels allow any number of communication channels to be created, deleted, and resized at run time.

Another advantage is that multiple clients may coexist on a single channel server. Several CPU boards may open communications channels on a common CPU board which provides a channel server. Since each channel client receives a private channel, the need for continuously arbitrating for a global memory pool is eliminated.

Embodiments of the interface and protocol are further independent of the target processor and operating system. The software used to implement the channel driver can be written to accommodate both big-endian and little-endian processors. Also, the implementor is allowed to define the interface to the channel driver software by providing a small number of user-defined software functions.

Different types of VME bus CPU boards can be accommodated since embodiments are independent of VME bus memory mapping. Channel addressing information is always maintained as an offset from the base address, which allows all CPU boards to directly translate this information into their own physical addresses. Furthermore, dual modes of data transfer, which can be changed at run time, are supported. The modes supported are message passing, in which a fixed message size is employed, and data streaming, in which variable sizes are employed.

While the best mode for carrying out the invention has been described in detail, those familiar with the art to which this invention relates will recognize various alternative designs and embodiments for practicing the invention as defined by the following claims.

What is claimed is:

1. A method of displaying one or more instructions of a source program utilizing a computer system having a display device, wherein the 'source program is compilable into a control program executable by a controller which is capable of controlling the operation of one or more devices, the method comprising the steps of:

receiving the one or more instructions of the source program; and displaying, on the display device, a ladder diagram representative of at least one of the one or more instructions, the ladder diagram comprising a graphical interconnection of one or more schematic elements, wherein at least one of the one or more schematic elements has a corresponding display width which is variable.

2. The method of claim 1 wherein the corresponding display width of a first of the schematic elements is variable with respect to the corresponding display width of a second of the schematic elements.

3. The method of claim 1 wherein the ladder-based language is a relay ladder logic language.

4. The method of claim 1 wherein the one or more instructions of the source program are in a high-level text-based language.

5. The method of claim 4 wherein the high-level text-based Language is a C-based programming language.

6. The method of claim 1 wherein the at least one of the one or more schematic elements contains a corresponding symbol.

7. The method of claim 6 wherein the at least one of the one or more schematic elements contains a corresponding label.

8. The method of claim 7 wherein the step of displaying comprises the step of varying the corresponding display width of the at least one of the one or more schematic elements in dependence upon a corresponding symbol display width and a corresponding label display width.

9. The method of claim 8 wherein the corresponding display width is varied in dependence upon the greater of the corresponding symbol display width and the corresponding label display width.

10. The method of claim 9 wherein the corresponding symbol display width is derived from a sum of a corresponding symbol width and a symbol spacing width.

11. The method of claim 9 wherein the corresponding label display width is derived from a sum of a corresponding label width and a label spacing width.

12. The method of claim 1 wherein the ladder diagram contains a parallel interconnection of schematic elements.

13. The method of claim 12 wherein the parallel interconnection defines a plurality of branches.

14. The method of claim 13 wherein the step of displaying comprises the step of varying the corresponding display width of at least one of the schematic elements of the parallel interconnection in dependence upon a greatest branch display width of the plurality of branches.

15. The method of claim 14 wherein the step of varying the corresponding display width comprises the steps of:

calculating a corresponding branch display width for each of the plurality of branches of the parallel interconnection; and determining the greatest of the corresponding branch display widths of the plurality of branches.

16. The method of claim 15 wherein the step of calculating the corresponding branch display width includes the steps of:

determining the corresponding display width of each of the schematic elements of the parallel interconnection; and calculating a corresponding sum for each branch of the plurality of branches, the corresponding sum of each branch derived from the corresponding display width of each of the schematic elements within the branch.

17. The method of claim 14 wherein the step of varying the corresponding display width comprises the step of determining the corresponding display width of each of the schematic elements of the parallel interconnection.

18. The method of claim 14 wherein the corresponding display width of the at least one of the schematic elements of the parallel interconnection is varied so that a corresponding branch display width of each of the plurality of branches is substantially equal to the greatest branch display width.

19. A system for displaying one or more instructions of a source program utilizing a computer system having a display device, wherein the source program is compilable into a control program executable by a controller which is capable of controlling the operation of one or more devices, the system comprising:

receiving means for receiving the one or more instructions of the source program; and variable width display means for displaying on the display device a ladder diagram representative of at least one of the one or more instructions, the ladder diagram comprising a graphical interconnection of one or more schematic elements, wherein at least one of the one or more schematic elements has a corresponding display width which is variable.

20. The system of claim 19 wherein the corresponding display width of a first of the schematic elements is variable with respect to the corresponding display width of a second of the schematic elements.

21. The system of claim 19 wherein the ladder-based language is a relay ladder logic language.

22. The system of claim 19 wherein the one or more instructions of the source program are in a high-level text-based language.

23. The system of claim 22 wherein the high-level text-based language is a C-based programming language.

24. The system of claim 19 wherein the at least one of the one or more schematic elements contains a corresponding symbol.

25. The system of claim 24 wherein the at least one of the one or more schematic elements contains a corresponding label.

26. The system of claim 25 further comprising means for varying the corresponding display width of the at least one of the one or more schematic elements in dependence upon a corresponding symbol display width and a corresponding label display width.

27. The system of claim 26 wherein the corresponding display width is varied in dependence upon the greater of the corresponding symbol display width and the corresponding label display width.

28. The system of claim 27 wherein the corresponding symbol display width is derived from a sum of a corresponding symbol width and a symbol spacing width.

29. The system of claim 27 wherein the corresponding label display width is derived from a sum of a corresponding label width and a label spacing width.

30. The system of claim 19 wherein the ladder diagram contains a parallel interconnection of schematic elements.

31. The system of claim 30 wherein the parallel interconnection defines a plurality of branches.

32. The system of claim 31 wherein the variable width display means comprises means for varying the corresponding display width of at least one of the schematic elements of the parallel interconnection in dependence upon a greatest branch display width of the plurality of branches.

33. The system of claim 32 wherein the means for varying the corresponding display width comprises:

means for calculating a corresponding branch display width for each of the plurality of branches of the parallel interconnection; and means for determining the greatest of the corresponding branch display widths of the plurality of branches.

34. The system of claim 33 wherein the means for calculating the corresponding branch display width includes:

means for determining the corresponding display width of each of the schematic elements of the parallel interconnection; and means for calculating a corresponding sum for each branch of the plurality of branches, the corresponding sum of each branch derived from the corresponding display width of each of the schematic elements within the branch.

35. The system of claim 32 wherein the means for varying the corresponding display width comprises means for determining the corresponding display width of each of the schematic elements of the parallel interconnection.

36. The system of claim 32 wherein the corresponding display width of the at least one of the schematic elements of the parallel interconnection is varied so that a corresponding branch display width of each of the plurality of branches is substantially equal to the greatest branch display width.

* * * * *